United States Patent
Chen et al.

(10) Patent No.: US 8,817,842 B2
(45) Date of Patent: Aug. 26, 2014

(54) COMMUNICATION DEVICE WITH INTELLIGENT FREQUENCY HOPPING CHANNEL SELECTION CAPABILITY

(75) Inventors: Yan-Yu Chen, Changhua County (TW); Chung-Yao Chang, Zhubei (TW)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

(21) Appl. No.: 13/618,572

(22) Filed: Sep. 14, 2012

(65) Prior Publication Data
US 2013/0077655 A1   Mar. 28, 2013

(30) Foreign Application Priority Data
Sep. 22, 2011 (TW) .............................. 100134166 A

(51) Int. Cl.
*H04B 1/00* (2006.01)
*H04B 1/715* (2011.01)

(52) U.S. Cl.
CPC ........ *H04B 1/715* (2013.01); *H04B 2001/7154* (2013.01)
USPC ....................................................... 375/132

(58) Field of Classification Search
CPC ....... H04B 1/713; H04B 1/7136; H04B 1/715
USPC .................................................. 375/132, 133
See application file for complete search history.

(56) References Cited

U.S. PATENT DOCUMENTS

| | | | |
|---|---|---|---|
| 7,035,314 B1 * | 4/2006 | Linsky .......................... | 375/133 |
| 7,236,511 B2 * | 6/2007 | Batra et al. .................... | 375/132 |
| 2002/0136268 A1 * | 9/2002 | Gan et al. ...................... | 375/133 |
| 2003/0058829 A1 * | 3/2003 | Batra ............................. | 370/345 |
| 2003/0147453 A1 * | 8/2003 | Batra ............................. | 375/132 |
| 2004/0240526 A1 * | 12/2004 | Schmandt et al. ............ | 375/135 |
| 2006/0133543 A1 * | 6/2006 | Linsky et al. ................. | 375/341 |
| 2007/0206660 A1 * | 9/2007 | Lifchuk ......................... | 375/132 |
| 2008/0219323 A1 * | 9/2008 | Desai et al. ................... | 375/132 |
| 2009/0041088 A1 * | 2/2009 | Yang et al. .................... | 375/132 |
| 2009/0195827 A1 * | 8/2009 | Kimura et al. ............... | 358/1.15 |
| 2012/0076173 A1 * | 3/2012 | Chang et al. .................. | 375/132 |

\* cited by examiner

*Primary Examiner* — Jean B Corrielus
(74) *Attorney, Agent, or Firm* — Birch, Stewart, Kolasch & Birch, LLP

(57) ABSTRACT

A communication device is disclosed, having a transceiving circuit, a timer circuit, and a control circuit. The transceiving circuit is used to transceive frequency hopping signals according to at least part of good channels in a channel map. The timer circuit is used to calculate a timespan of one or more communication intervals in which the transceiving circuit transceives the frequency hopping signals. The control circuit is used to compare the timespan with a time threshold to determine whether signal transmission tests with one or more bad channels in the channel map should be performed to update the channel map.

20 Claims, 8 Drawing Sheets

COMMUNICATION DEVICE WITH INTELLIGENT FREQUENCY HOPPING CHANNEL SELECTION CAPABILITY

CROSS-REFERENCE TO RELATED APPLICATIONS

This application claims the benefit of priority to Taiwanese Patent Application No. 100134166, filed on Sep. 22, 2011; the entirety of which is incorporated herein by reference for all purposes.

BACKGROUND

The disclosure generally relates to communication devices and, more particularly, to communication devices with intelligent frequency hopping channel selection capability.

Wireless communications have brought people the convenience in every aspect of life and therefore wireless communication devices are getting more and more popular. Some wireless communication devices constantly occupy a specific frequency band for performing communications so that the communications of other devices in the same frequency band are affected. To avoid or reduce the interference in those specific frequency bands, some communication systems adopt an adaptive frequency hopping (AFH) technique. For example, the Bluetooth standard adopts the AFH technique for performing the transmission of speech, data, and control signals.

The communication devices adopting the AFH technique must have the capability to generate the channel map for performing adaptive frequency hopping communication. The channel map keeps a record of the locations of the good channels and the bad channels in a specific frequency band. The good channels are the channels with which the communication devices usually try to perform frequency hopping communications so as to achieve a better communication performance. On the other hand, the bad channels are the channels without which the communication devices usually try to perform frequency hopping communications so as not to degrade the communication performance. Thus, the communication devices must know the locations of the good channels and the bad channels, and record them in the channel map.

An interference signal may appear, disappear, or vary its signal strength when a communication device is turned on, turned off, or moved in the neighborhood. Thus, a good channel in the channel map may become a bad channel and a bad channel may also become a good channel at different periods of time. The communication devices adopting the AFH technique must be aware of the communication conditions of the channels and keep recording in the channel map as many good channels as possible to maintain the communication performance at an acceptable level. Therefore, the communication devices must perform signal transmission tests to evaluate the communication conditions of the channels, and keep updating the channel map accordingly.

When performing the signal transmission tests to evaluate the communication conditions of the channels, the communication devices usually performs frequency hopping communications with several good channels in company with one or more channels under test. Even if one of the channels under test is a bad channel, the communication performance may be still degraded. Thus, if the communication device does not perform the signal transmission tests and update the channel map with a suitable mechanism, the communication performance may be severely degraded and the communication may not even be sustainable.

SUMMARY

An example embodiment of a communication device for performing frequency hopping communications in a plurality of channels of a frequency band, comprising: a transceiving circuit, for transceiving frequency hopping signals with at least part of a plurality of good channels in a channel map, wherein the channel map records the locations of the good channels in the frequency band; a timer circuit, for recording a timespan of one or more communication intervals in which the transceiving circuit transceives the frequency hopping signals; and a control circuit, coupled with the transceiving circuit and the timer circuit, for comparing the timespan with a time threshold to determine whether signal transmission tests should be perform to update the channel map; wherein the transceiving circuit transceives the frequency hopping signals with at least part of the good channels and at least part of the bad channels when the control circuit performs signal transmission tests.

Another example embodiment of a communication device for performing frequency hopping communication in a plurality of channel of a frequency band, comprising: a transceiving circuit for transceiving frequency hopping signals with at least part of a plurality of good channels in a channel map, wherein the channel map records the locations of the good channels in the frequency band; and a control circuit, coupled with the transceiving circuit, for configuring the transceiving circuit to transceive the frequency hopping signals according to one or more first channels chosen from a plurality of consecutive bad channels in company with at least part of the good channels when the number of the consecutive bad channels is greater than a bandwidth threshold; wherein the first channels are not neighboring to the good channels.

Another example embodiment of a method for performing frequency hopping communications in a plurality of channels of a frequency band, comprising: transceiving frequency hopping signals with at least part of a plurality of good channels in a channel map; recording a timespan of one or more communication intervals for transceiving the frequency hopping signals; and comparing the timespan with a time threshold to determine whether signal transmission tests should be perform to update the channel map; wherein the channel map records the locations of the good channels in the frequency band; and the transceiving circuit transceives the frequency hopping signals with at least part of the good channels and at least part of the bad channels when the control circuit performs signal transmission tests.

It is to be understood that both the foregoing general description and the following detailed description are example and explanatory only and are not restrictive of the invention, as claimed.

BRIEF DESCRIPTION OF THE DRAWINGS

FIGS. 5~8 show several example channel maps stored in the storage device in FIG. 1, all arranged according to at least some embodiment of the disclosure described herein.

DETAILED DESCRIPTION

Reference will now be made in detail to embodiments of the invention, which are illustrated in the accompanying drawings.

Figure 1:
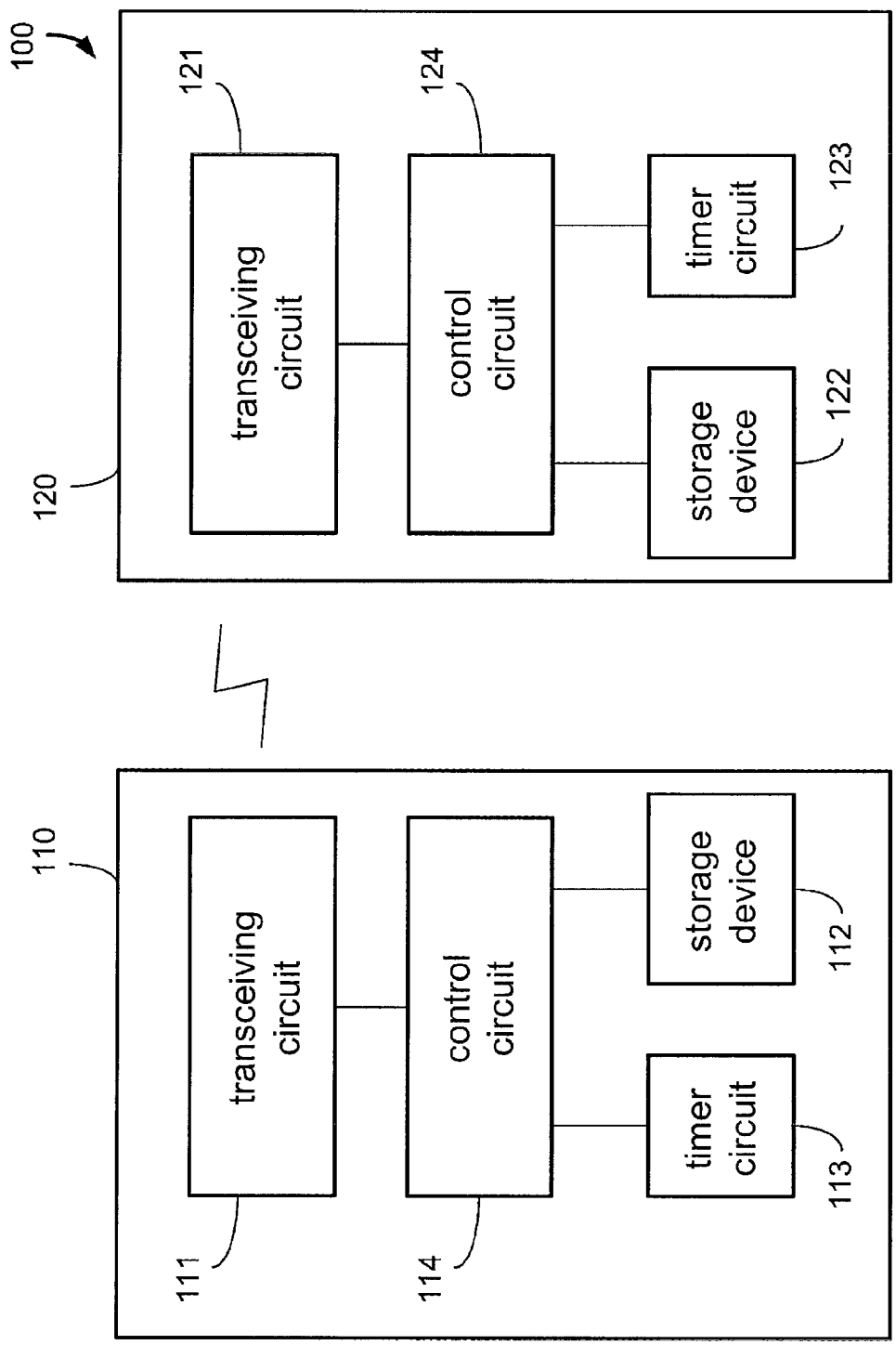
FIG. 1 shows a simplified functional block diagram of an example communication system.

FIG. 1 shows a simplified functional block diagram of an example communication system 100, according to at least some embodiments of the disclosure. The communication system 100 comprises communication device 110 and 120, which may perform communications with the adaptive frequency hopping (AFH) technique. In this disclosure, the communication devices 110 and 120 perform frequency hopping communications according to the Bluetooth standard for the purpose of clearer explanation.

The communication devices 110 and 120 respectively comprise transceiving circuits 111 and 121, storage devices 112 and 122, timer circuits 113 and 123, and control circuits 114 and 124.

The transceiving circuits 111 and 121 are used to transceive (transmit and/or receive) frequency hopping signals. For example, the transceiving circuit 111 and 121 may respectively comprise the radio frequency circuit, the demodulating circuit, and/or the antenna for transceiving frequency hopping signals.

The storage devices 112 and 122 are used to store the channel maps. The storage devices 112 and 122 may be realized with any suitable volatile and/or non-volatile memory devices which may be configured in the interior or the exterior of the communication devices 110 and 120.

The timer circuit 113 and 123 may be used to record the timespan of one or more communication intervals in which the transceiving circuits 111 and 121 perform the frequency hopping communications (i.e., transceive frequency hopping signals). Thus, the control circuit 114 and 124 may determine whether the channel map should be updated according to the recorded timespan in the timer circuits 113 and 123.

The control circuits 114 and 124 may be used to generate and/or update the channel map so that the communication devices 110 and 120 may perform frequency hopping communications accordingly.

The transceiving circuits 111 and 121, the storage devices 112 and 122, the timer circuits 113 and 123, and the control circuits 114 and 124 may be respectively realized with software, firmware, hardware, and/or the combination thereof. Moreover, a single functional block in the drawings may be realized with one or more integrated circuit elements and/or discrete circuit elements. For example, in one embodiment, the timer circuit 113 and the control circuit 114 may be realized with a processor in company with the software.

Figure 2:
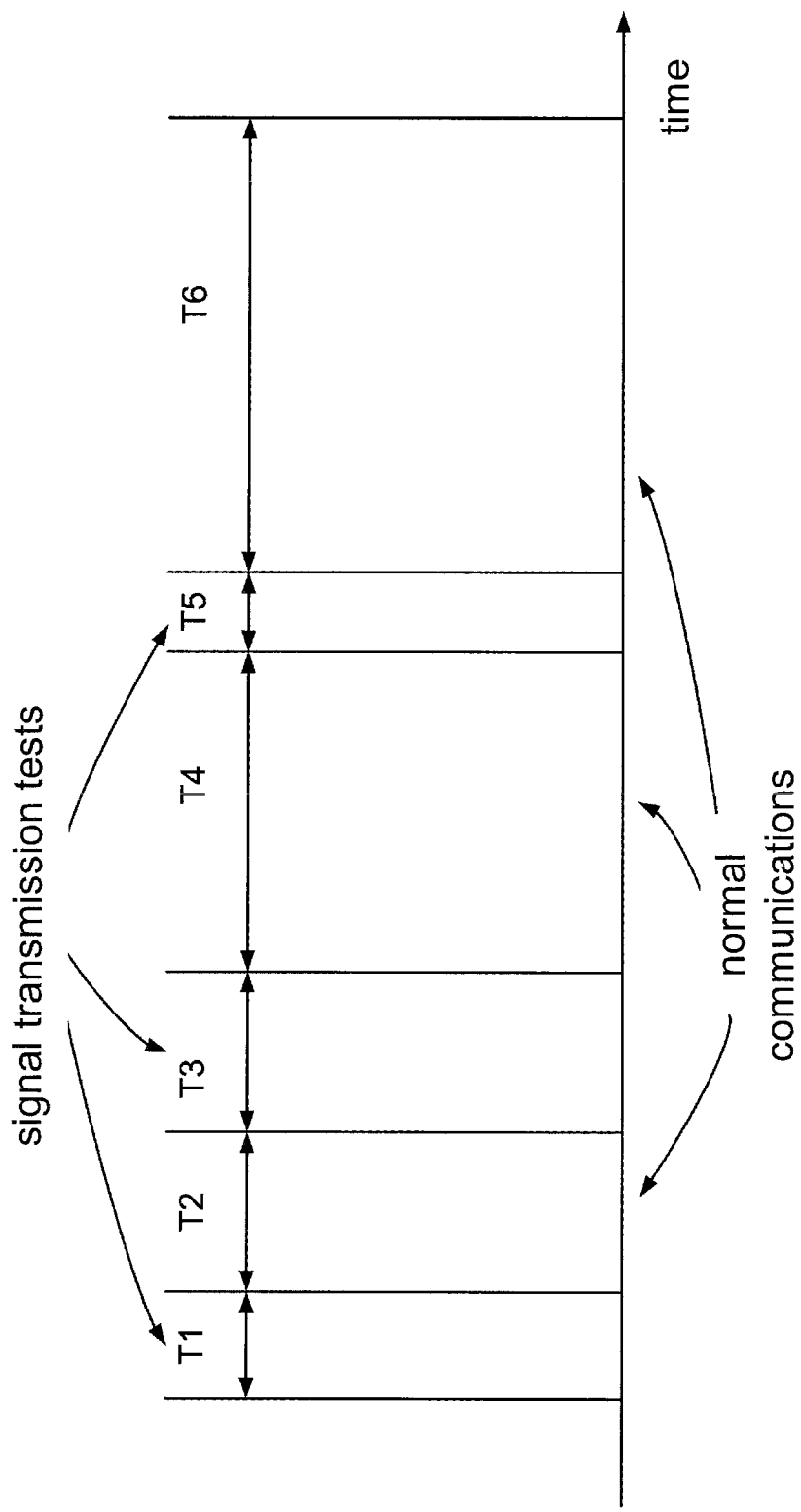
FIG. 2 shows an example timing diagram in which the communication devices in FIG. 1 perform communications.
Figure 3:
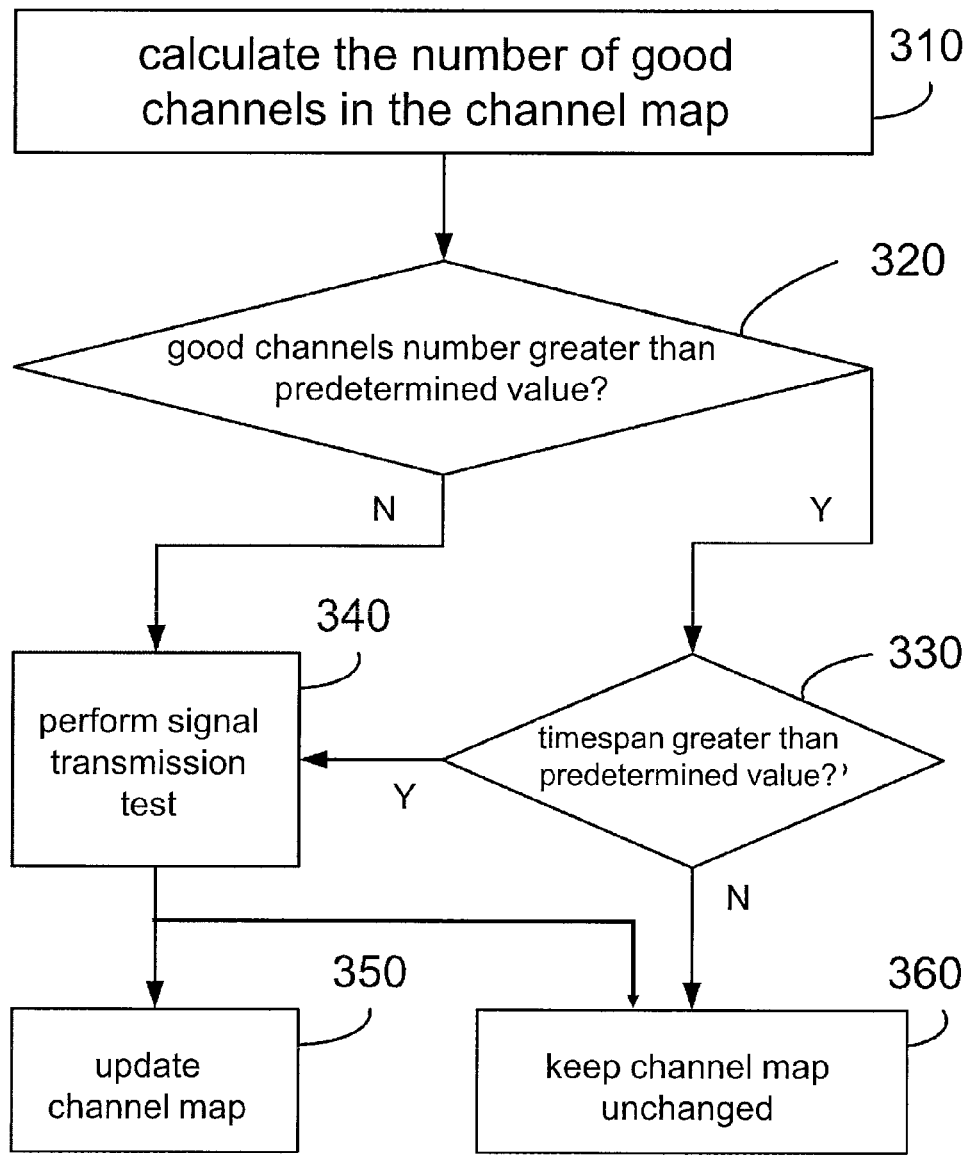
FIG. 3 shows a simplified flowchart of an example channel map updating method of the communication device in FIG. 1.

FIG. 2 shows a simplified timing diagram in which the communication devices 110 and 120 perform communications. FIG. 3 shows a simplified flowchart of an example channel updating method of the communication device 110, according to at least some embodiments of the disclosure. The operation of the communication system 100 is further explained below with FIGS. 1~3.

In the periods of time T1, T3 and T5 in FIG. 2, the control circuit 114 configures the transceiving circuit 111 to perform signal transmission tests with several good channels in company with one or more bad channels (i.e., the channels under test) according to the channel map. The control circuit 114 evaluates the communication performance of the signal transmission tests, and updates the channel map accordingly (when necessary). Therefore, the transceiving circuit 111 may perform frequency hopping communications with the most updated channel map. For example, the transceiving circuit 111 performs frequency hopping communications with good channels in the periods of time T2, T4 and T6 respectively according to the channel maps updated in the periods of time T1, T3 and T5.

The periods of time T1~T6 may be respectively configured to be of the same length of time or different lengths of time. For example, in FIG. 2, the periods of time T1~T6 are configured to be different from each other. In another embodiment, the periods of time T1, T3 and T5 are configured to be of the same length of time.

In the periods of time T1, T3 and T5, the communication device 110 may perform signal transmission tests with good channels and the channel(s) under test in the channel map. The channel map may be updated according to the channel updating method in FIG. 3. In the periods of time T2, T4 and T4, the communicate device 110 performs normal communications, i.e., performs frequency hopping communication with only good channels in the channel map.

In the operation 310, the control circuit 114 calculates the number of the good channels in the channel map.

In the operation 320, the control circuit compares the number of the good channels with a predetermined channel threshold. When the number of the good channels in the channel map is greater than the predetermined channel threshold, the method proceeds to the operation 330. When the number of the good channels in the channel map is less than the predetermined channel threshold, the method proceeds to the operation 340.

In the operation 330, the control circuit 114 compares the timespan recorded in the timer circuit 113 with a predetermined time threshold. When the timespan recorded in the timer circuit 113 is greater than the predetermined time threshold, the method proceeds to the operation 340. When the timespan recorded in the timer circuit 113 is less than the predetermined time threshold, the method proceeds to the operation 360.

In the operation 340, the control circuit 114 configures the transceiving circuit 111 to perform signal transmission tests with at least part of the good channels in company with one or more bad channels (i.e., the channels under test) in the channel map. The control circuit 114 evaluates the communication conditions of the channel(s) under test according to the communication performance of the signal transmission tests.

In the operation 350, the control circuit 114 updates the channel map in the storage device 112. When the communication performance of the signal transmission tests is above a predetermined level, the control circuit 114 configures the channel(s) under test to be the good channel(s) in the channel map. Moreover, the control circuit 114 may reset the timespan recorded in the timer circuit 113 according to the number of the good channel in the channel map. When the communication performance of the signal transmission tests is below the predetermined level, the method proceeds to the operation 360.

In the operation 360, the control circuit 114 keeps the channel map unchanged in the storage device 112. When the communication performance of the signal transmission tests is below the predetermined level, the channels under test are still recorded as bad channels in the channel map.

In the periods of time T2, T4 and T6, the control circuit 114 configures the transceiving circuit 111 to perform frequency hopping communication with at least part of the good channels according to the channel maps updated in the periods of time T1, T3 and T5.

In another embodiment, the control circuit 114 may configure the predetermined channel threshold and/or the time threshold, perform signal transmission tests, and/or update the channel map according to the number of the bad channels in the channel map or according to the numbers of the good channels and the bad channels in the channel map. For example, in the operation 320 of another embodiment, when the number of the bad channels in the channel map is less than a predetermined channel threshold, the method proceeds to the operation 330. When the number of the bad channels in the channel map is greater than the predetermined channel threshold, the method proceeds to the operation 340.

The timer circuit 113 may be configured to record the accumulated timespan of the communication intervals in which the transceiving circuit 111 performs frequency hopping communications. In the operation 330, when the timespan recorded in the timer circuit 113 is greater than the predetermined time threshold, the method proceeds to the operation 340. When the timespan recorded in the timer circuit 113 is less than the predetermined time threshold, the method proceeds to the operation 360.

In another embodiment, the timer circuit 113 may also be configured to be in the countdown manner. In the operation 330, when the timespan recorded in the timer circuit 113 is less than the predetermined time threshold, the method proceeds to the operation 340. When the timespan recorded in the timer circuit 113 is greater than the predetermined time threshold, the method proceeds to the operation 360.

In another embodiment, the timer circuit 113 may be configured to record the amount of the transmitted data and/or the received data. In still another embodiment, the timer circuit 113 may be configured to record the transmitted and/or received amount of specific signals in the accumulated manner or in the countdown manner so as to record the timespan of the communication interval(s) in which the transceiving circuit 111 performs frequency hopping communications.

The signal to noise ratio (SNR), the packet error rate (PER), the number of packet errors, the error rate of the frame check sequences, the error number of the frame check sequences, the error rate of the header check sequence, the error number of the header sequence, the number of packet retransmission, and/or other parameters may be adopted as evaluation values. In the operation 340, the control circuit 114 may compare one or more evaluation values with the predetermined evaluation threshold(s) and/or with the previously stored evaluation value(s) to evaluate the communication conditions of the channels with which the transceiving circuit 111 performed signal transmission tests.

In one embodiment, the PER is used as the evaluation value. When the PER of the signal transmission tests in the period of time T3 is less than or equal to the PER of the frequency hopping communications in the period of time T2 and/or less than or equal to a predetermined evaluation threshold, the channels for performing signal transmission tests in the period of time T3 is considered to be good channels. Thus, the control circuit 114 configures the channels under test in the period of time T3 to be good channels in the channel map in the operation 350.

In another embodiment, the SNR is used as the evaluation value. When the SNR of the signal transmission tests in the period of time T3 is less than the SNR of the frequency hopping communications in the period of time T2 and/or less than a predetermined evaluation threshold, at least one of the channels for performing signal transmission tests in the period of time T3 may still be the bad channel(s). Thus, the control circuit 114 may keep the channel map unchanged in the operation 360.

In another embodiment, the control circuit 114 may configure the predetermined time threshold to be one of the predetermined values according to the number of good channels in the channel map. For example, when the number of good channels in the channel map is greater than 60, the control circuit 114 configures the predetermined time threshold of the timer circuit 113 to be 20 minutes. When the number of good channels in the channel map is between 40 and 60, the control circuit 114 configures the predetermined time threshold of the timer circuit 113 to be 10 minutes. When the number of good channels in the channel map is less than 40, the control circuit 114 configures the predetermined time threshold of the timer circuit 113 to be 3 minutes.

For example, in FIG. 2, after the communication device 110 finished the signal transmission tests and updated the channel map in the period of time T1, the number of good channels in the channel map is not abundant so that the control circuit 114 configures the predetermined time threshold of the timer circuit 113 to be a lower value. Thus, the communication device 110 needs to perform another signal transmission test after a shorter period of time (i.e., T2 in FIG. 2) according to the channel map and the predetermined time threshold updated in the period of time T1. After the communication device 110 finished the signal transmission tests and updated the channel map in the period of time T3, the number of good channels in the channel map is more acceptable so that the control circuit 114 configures the predetermined time threshold of the timer circuit 113 to be a higher value. The communication device 110 may therefore perform another signal transmission test after a longer period of time T4 (compared with T2) according to the channel map and the time threshold updated in the period of time T3.

In another embodiment, the control circuit 114 may configures the predetermined time threshold and/or the recorded timespan of the timer circuit 113 according to the number of good channels, the number of bad channels, or the numbers of good channels and bad channels in the channel map. Therefore, the control circuit 114 may compare the recorded timespan and the predetermined time threshold in operation 330 and perform suitable operations.

In another embodiment, the transceiving circuit 111 does not need to perform frequency hopping communications according to the most updated channel map. For example, in the period of time T4, the control circuit 114 may configure the transceiving circuit 111 to perform frequency hopping communications according to the channel map updated in the period of time T1. In the period of time T6, the control circuit 114 may configure the transceiving circuit 111 to perform frequency hopping communications according to the channel map updated in the period of time T3.

The order for performing the operations in FIG. 3 may also be adjusted. For example, the operation 330 may be performed after the operation 310. The control circuit 114 compares the recorded timespan with the predetermined time threshold. Afterwards, the operation 320 is performed after the operation 330 so as to compare the number of good channels with the predetermined channel threshold.

The transceiving circuit 111 may transmit data signals, control signals, or any suitable type of test signals in the signal transmission tests in the operation 340.

Figure 4:
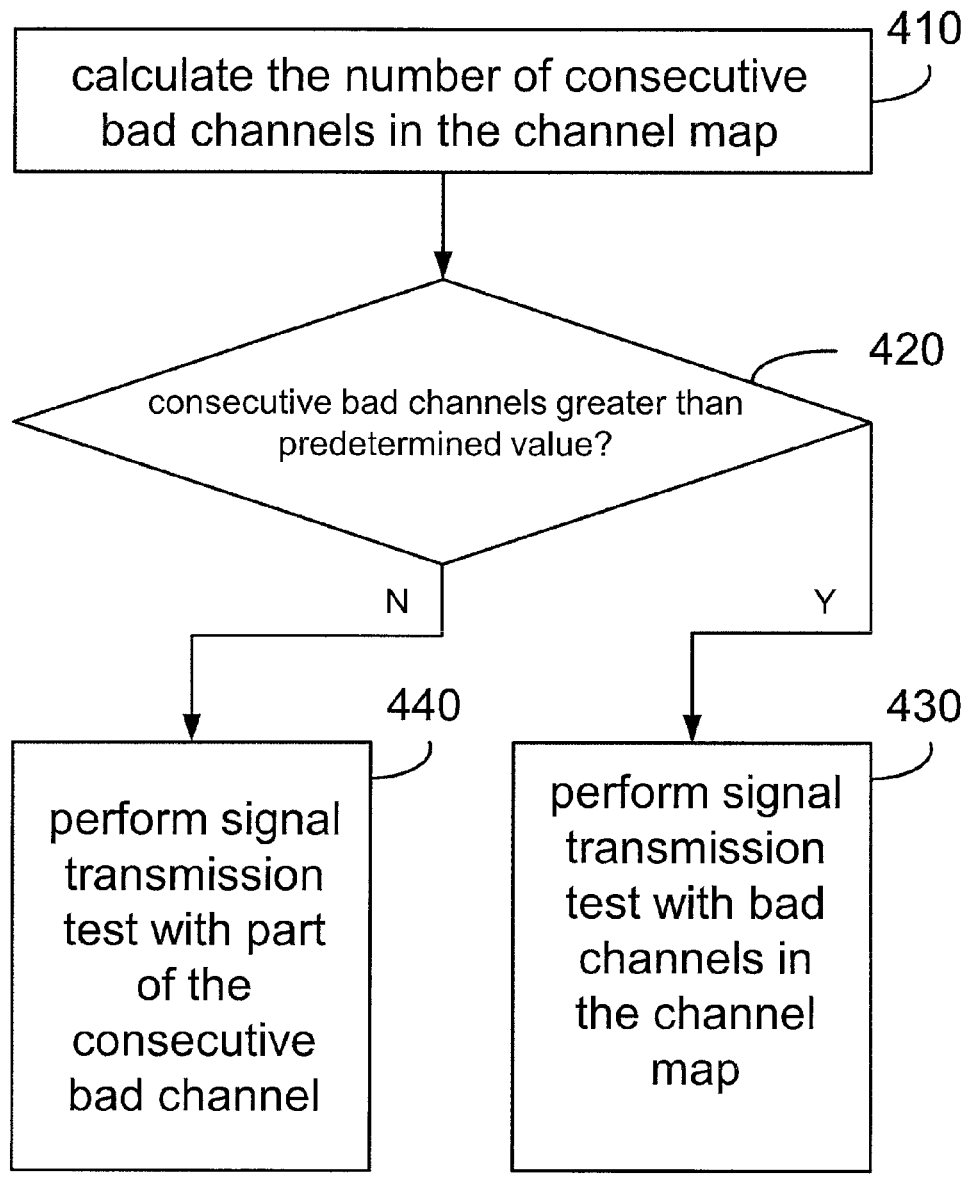
FIG. 4 shows a simplified flowchart of an example method for evaluating the communication conditions of the channels.

In the operation 340, the control circuit 114 may also adopt any suitable mechanism for performing signal transmission tests according to different design considerations and application environments. FIG. 4 shows a simplified flowchart of an example method for evaluating the communication conditions of the channels in the operation 340 and FIGS. 5~8 show several example channel maps stored in the storage device 112 at different periods of time, all according to at least some embodiments of the disclosure. The signal transmission tests performed by the control circuit 114 in the operation 340 are further explained below with FIGS. 4~8.

The channel maps of the Bluetooth system are adopted as examples in FIGS. 4~8. There are 80 channels (numbered as 0~79) each of which has a bandwidth of 1 MHz. The channel map records the locations and the communication conditions of the channels in a specific frequency band. In the Bluetooth system, the control circuit 114 must choose at least two neighboring channel for performing signal transmission tests. For example, the control circuit 114 may choose the two channels 2 and 3 as the channels under test. In FIGS. 5~8, only channels 0~40 are shown for the purpose of conciseness and clearer explanation.

In the operation 410, the control circuit 114 calculates the number of consecutive bad channels in the channel map.

In the operation 420, the control circuit 114 compares the number of consecutive bad channels with a predetermined bandwidth threshold. When the number of consecutive bad channels is less than the predetermined bandwidth threshold, there are no interference signals occupying a large bandwidth in the frequency band and the method proceeds to the operation 430. When the number of consecutive bad channels is greater than or equal to the predetermined bandwidth threshold, there are interference signals occupying a large bandwidth in the frequency band and the method proceeds to the operation 440.

In the operation 430, the control circuit 114 configures the transceiving circuit 111 to perform signal transmission tests with part of the good channels in company with one or more pairs of bad channels in the channel map.

In the operation 440, the control circuit 114 configures the transceiving circuit 111 to perform signal transmission tests with part of the good channels in company with one or more pairs of bad channels chosen from the consecutive bad channels in the channel map. Moreover, the chosen pair(s) of bad channels may not be neighboring to the good channels in the channel map, i.e., the chosen pair of bad channels and the good channels must be separated by at least another bad channel in the channel map. This mechanism is simple, systematic, and efficient. The process of signal transmission tests with bad channels may therefore be expedited accordingly.

In FIGS. 5~8, the blocks with numbers denote the channels for Bluetooth communication. The channel marked with only one number denotes a good channel. The channel marked with a number and a "B" denotes a bad channel. For example, the wireless LAN signals are transmitted in the same 2.4 GHz ISM band as the Bluetooth signals and usually occupy a bandwidth of 20 MHz. Namely, when there is a wireless LAN interference signal, approximately 20 consecutive 1 MHz channels would be marked with a "B" in the channel map. In the following embodiments, the bandwidth threshold is configured to be 16 and accordingly the method specifically deals with signal transmission tests when one or more interference signals occupying more than 16 channels present in the frequency band.

Figure 5:
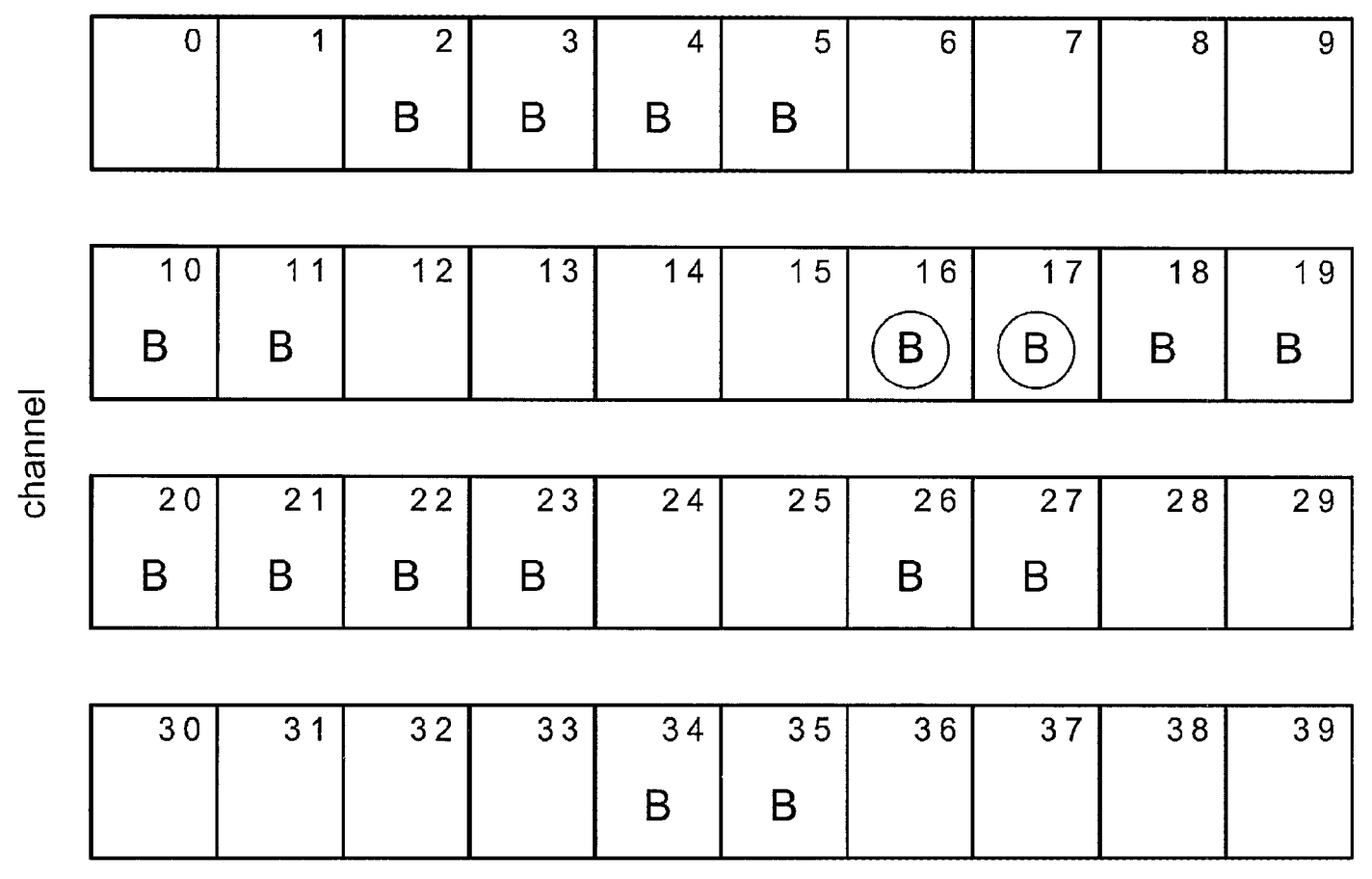
Figure 6:
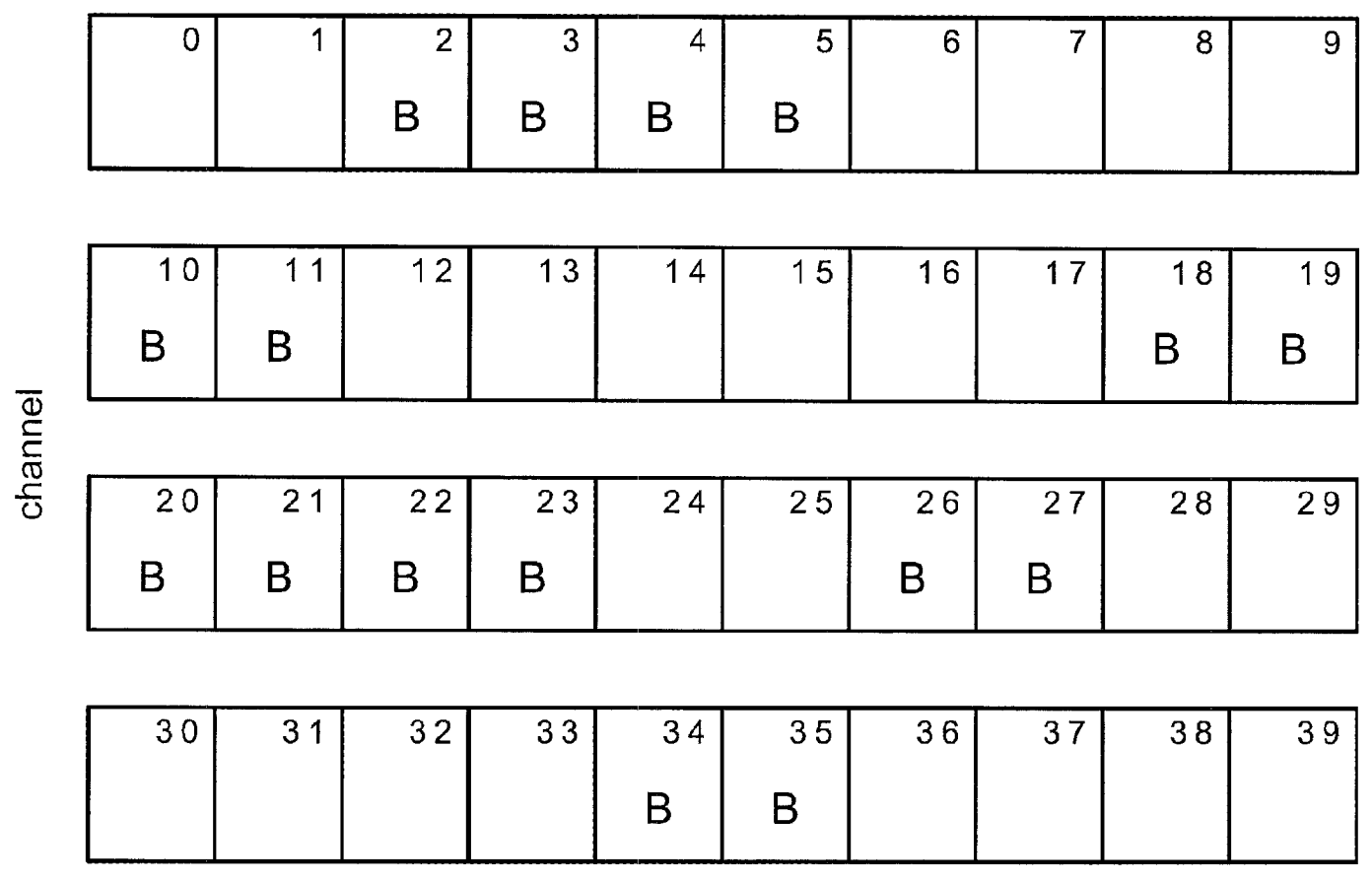

FIGS. 5 and 6 illustrate two example channel maps when the control circuit 114 performs signal transmission tests according to the operations 410, 420 and 430 in FIG. 4.

In the channel map in FIG. 5, the number of consecutive bad channel is less than the bandwidth threshold, i.e., 16. The control circuit 114 performs the signal transmission tests in the operation 430. A pair of bad channels 16 and 17 is chosen to perform signal transmission tests in company with at least part of the good channels in the channel map. Moreover, the control circuit 114 may adopt the SNR, the PER, the number of packet errors, the error rate of the frame check sequences, the error number of frame check sequences, the error rate of the header check sequences, the error number of header sequences, the number of packet retransmission, and/or other parameters as evaluation values. The control circuit 114 may compare one or more evaluation values respectively with one or more predetermined evaluation thresholds or previously stored evaluation values to evaluate the communication conditions of the bad channels 16 and 17.

If the bad channels 16 and 17 have turned into good channels, the control circuit 114 configures the channels 16 and 17 to be good channels in the channel map as shown in FIG. 6. The control circuit 114 may continue signal transmission tests with other bad channels or stop signal transmission tests.

Figure 7:
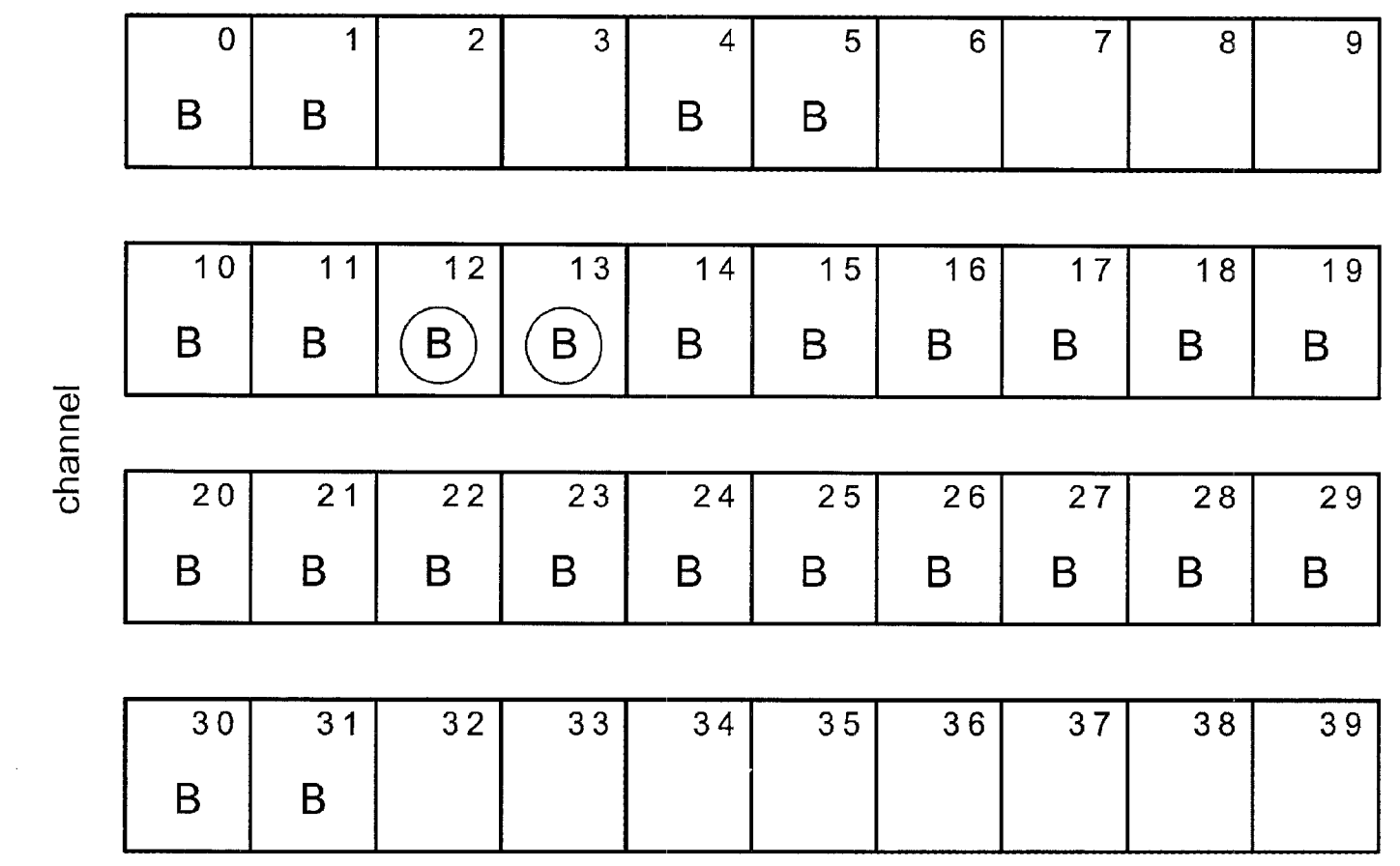
Figure 8:
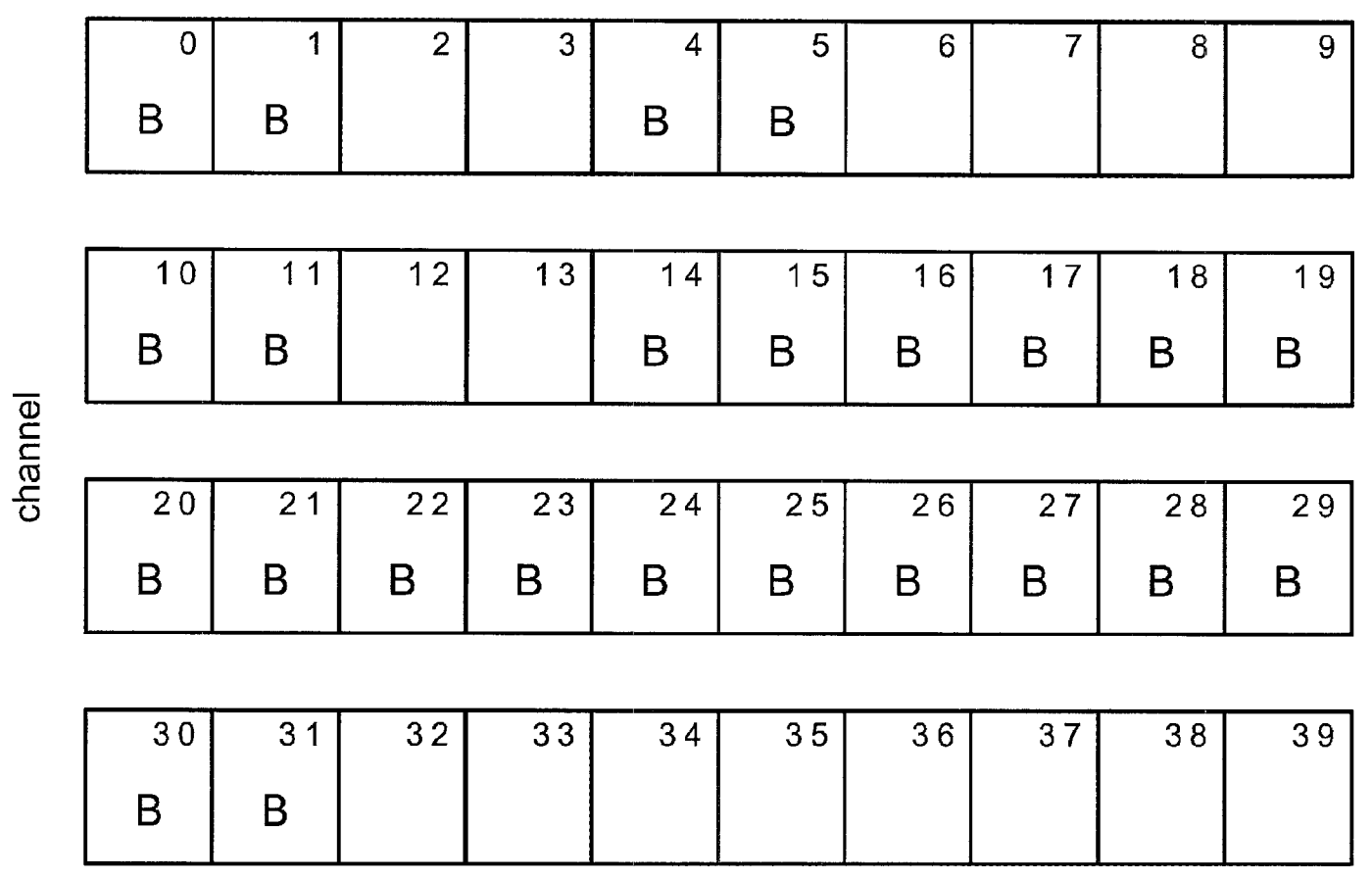

FIGS. 7 and 8 illustrate another two example channel maps when the control circuit 114 performs signal transmission tests according to the operations 410, 420 and 440 in FIG. 4.

In the channel map in FIG. 7, the number of consecutive bad channel is greater than the bandwidth threshold, 16. The control circuit 114 performs the signal transmission tests in the operation 440.

The control circuit 114 chooses one or more pairs of bad channels from the 22 consecutive bad channels in FIG. 7 to perform signal transmission tests in company with at least part of the good channels in the channel map. Moreover, both of the chosen bad channels are not neighboring to the good channels in the channel map. For example, the chosen bad channels 12 and 13 in FIG. 7 are only neighboring to bad channels 11 and 14. The control circuit 114 may adopt the SNR, the PER, the number of packet errors, the error rate of the frame check sequences, the error number of frame check sequences, the error rate of the header check sequences, the error number of header sequences, the number of packet retransmission, and/or other parameters as evaluation values. The control circuit 114 may compare one or more evaluation values respectively with one or more predetermined evaluation thresholds or previously stored evaluation values to evaluate the communication conditions of the bad channels 12 and 13.

If the bad channels 12 and 13 have turned into good channels, the control circuit 114 configures the channels 12 and 13 to be good channels in the channel map as shown in FIG. 8. The control circuit 114 may continue signal transmission tests with other bad channels or stop signal transmission tests.

In the above embodiment, the control circuit 114 may configure the bandwidth threshold to be any suitable values according to different application environments.

In the above embodiments, the method in FIG. 4 is applied in the Bluetooth system so that two neighboring channels must be chosen to perform signal transmission tests together. In other embodiments, when the method in FIG. 4 is applied in other systems, one or more channels which are neighboring or not neighboring to each other may be chosen to perform signal transmission tests.

Because the signal transmission tests may degrades the communication performance, only one pair of bad channels are chosen in company with good channels to perform signal transmission tests in the embodiments above. In other embodiments, one or more pairs of bad channels may be chosen to perform signal transmission tests according to different application environments.

In the embodiments in FIG. 5~8, when the channels under test have turned into good channels, the control circuit 114 may also perform the signal transmission tests with other bad channels in company with the channels under test and other good channels in the channel map.

In the embodiments in FIGS. 5 and 6, the control circuit 114 may choose the bad channels according to any suitable mechanism. For example, the control circuit 114 may choose the bad channels in the channel map sequentially, arbitrarily, or according other algorithms for performing signal transmission tests.

In the embodiments in FIGS. 7 and 8, the control circuit 114 may also choose the bad channels according to any suitable mechanism. In one embodiment, the control circuit 114 may choose a pair of bad channels which are closest to but not neighboring to the good channels in the channel map. For example, the channels 12 and 13 and the channels 28 and 29 are the two pairs of bad channels which are closest to but not neighboring to the good channels in the channel map.

When the channels under test have turned into good channels, the control circuit 114 may choose another pair of bad channels in the consecutive bad channels which are still not neighboring to good channels in the channel map for performing signal transmission tests. For example, in the embodiment in FIG. 8, when the channels 12 and 13 are turned into good channels, the control circuit 114 may choose the pair of channels 16 and 17 to perform signal transmission test. In another embodiment, when the channels under test have turned into good channels, the control circuit 114 may choose another pair of bad channels in the consecutive bad channels which are neighboring to good channels in the channel map for performing signal transmission tests. For example, when the channels 12 and 13 are turned into good channels, the control circuit 114 may choose the pair of channels 10 and 11 or the pair of channels 14 and 15 to perform signal transmission test.

In the above embodiments, the control circuit 114 may stop signal transmission tests according to any suitable condition. For example, the control circuit 114 may stop signal transmission tests and continue normal communications when the channels under test are not yet found to be good channels in the signal transmission tests. In another embodiment, the control circuit 114 may stop signal transmission tests and continue normal communications when the number of bad channels chosen for performing signal transmission tests exceeds a predetermined threshold. In another embodiment, the control circuit 114 may perform the signal transmission tests in a fixed period of time.

The above embodiments are explained with the operations of the communication device 110. In other embodiments, the communication device 130 may adopt the same or similar mechanism to perform signal transmission tests and update the channel map.

The same reference numbers may be used throughout the drawings to refer to the same or like parts or components/operations. Certain terms are used throughout the description and following claims to refer to particular components. As one skilled in the art will appreciate, a component may be referred by different names. This document does not intend to distinguish between components that differ in name but not in function. In the following description and in the claims, the term "comprise" is used in an open-ended fashion, and thus should be interpreted to mean "include, but not limited to . . . ." Also, the phrase "coupled with" is intended to compass any indirect or direct connection. Accordingly, if this document mentioned that a first device is coupled with a second device, it means that the first device may be directly or indirectly connected to the second device through electrical connections, wireless communications, optical communications, or other signal connections with/without other intermediate devices or connection means.

As used herein, the term "and/or" includes any and all combinations of one or more of the associated listed items. In addition, the singular forms "a", "an", and "the" as used herein are intended to include the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A communication device for performing frequency hopping communications in a plurality of channels of a frequency band, comprising:
    a transceiving circuit, for transceiving frequency hopping signals with at least part of a plurality of good channels in a channel map, wherein the channel map records the locations of the good channels in the frequency band;
    a timer circuit, for recording a timespan of one or more communication intervals in which the transceiving circuit transceives the frequency hopping signals; and
    a control circuit, coupled with the transceiving circuit and the timer circuit, for comparing the timespan with a time threshold to determine whether signal transmission tests should be performed to update the channel map;
    wherein the transceiving circuit transceives the frequency hopping signals with at least part of the good channels and at least part of the bad channels when the control circuit performs the signal transmission tests.

2. The communication device of claim 1, wherein the control circuit further configures the timespan to be one of a plurality of first predetermined values or configures the time threshold to be one of a plurality of second predetermined values according to the number of the good channels in the channel map.

3. The communication device of claim 1, wherein the channel map further records the locations of a plurality of bad channels in the frequency band; and the control circuit further configures the timespan to be one of a plurality of first predetermined values or configures the time threshold to be one of a plurality of second predetermined values according to the number of the bad channels in the channel map.

4. The communication device of claim 3, wherein when the control circuit performs the signal transmission tests and a number of the consecutive bad channels is greater than a bandwidth threshold, the transceiving circuit transceives the frequency hopping signals with one or more first channels chosen from the consecutive bad channels in company with at least part of the good channels; and the first channels are not neighboring to the good channels in the channel map.

5. The communication device of claim 4, wherein the transceiving circuit transceives the frequency hopping signals with one or more second channels chosen from the consecutive bad channels in company with the one or more good channels and with at least part of the first channels; and the second channels are not neighboring to the first channels.

6. The communication device of claim 1, wherein when the control circuit performs the signal transmission tests and the number of the good channels in the channel map is less than a channel threshold, the transceiving circuit transceives the frequency hopping signals with at least part of the good channels in company with one or more first channels chosen from the bad channels.

7. The communication device of claim 4, wherein when the control circuit performs the signal transmission tests and the number of the good channels in the channel map is less than a channel threshold, the transceiving circuit transceives the frequency hopping signals with at least part of the good channels in company with one or more second channels chosen from the bad channels.

8. The communication device of claim 1, wherein the control circuit uses at least one of a signal to noise ratio, a packet error rate, a packet error number, an error rate of the frame check sequence, an error number of a frame check sequence, an error rate of a header check sequence, an error number of the header check sequence, and a packet retransmission number as an evaluation value, and compares the evaluation value with an evaluation threshold or with a previously stored evaluation value so as to configure one or more first channels chosen from the bad channels to be the good channels in the channel map.

9. The communication device of claim 5, wherein the control circuit uses at least one of a signal to noise ratio, a packet error rate, a packet error number, an error rate of the frame check sequence, an error number of a frame check sequence, an error rate of a header check sequence, an error number of the header check sequence, and a packet retransmission number as an evaluation value, and compares the evaluation value with an evaluation threshold or with a previously stored evaluation value so as to configure the second channels to be the good channels in the channel map.

10. A communication device for performing frequency hopping communication in a plurality of channel of a frequency band, comprising:
a transceiving circuit for transceiving frequency hopping signals with at least part of a plurality of good channels in a channel map, wherein the channel map records the locations of the good channels in the frequency band; and
a control circuit, coupled with the transceiving circuit, for configuring the transceiving circuit to transceive the frequency hopping signals according to one or more first channels chosen from a plurality of consecutive bad channels in company with at least part of the good channels when the number of the consecutive bad channels is greater than a bandwidth threshold;
wherein the first channels are not neighboring to the good channels.

11. The communication device of claim 10, wherein the channel map further records the locations of a plurality of bad channels in the frequency band.

12. The communication device of claim 10, wherein the transceiving circuit transceives the frequency hopping signals according to one or more second channels chosen from the consecutive bad channels in company with at least part of the good channels and at least part of the first channels; and the second channels are not neighboring to the first channels.

13. The communication device of claim 10, wherein when the control circuit performs signal transmission tests and the number of the consecutive bad channels is less than the bandwidth threshold, the transceiving circuit transceives the frequency hopping signals with one or more second channels chosen from the bad channels in company with at least part of the good channels.

14. The communication device of claim 10, further comprises:
a timer circuit, for recording a timespan of one or more communication intervals in which the transceiving circuit transceives the frequency hopping signals;
wherein the control circuit compares the timespan with a time threshold so as to configure the transceiving circuit to transceive the frequency hopping signals according to at least part of the good channels in company with at least part of the bad channels.

15. The communication device of claim 14, wherein the control circuit uses at least one of a signal to noise ratio, a packet error rate, a packet error number, an error rate of the frame check sequence, an error number of a frame check sequence, an error rate of a header check sequence, an error number of the header check sequence, and a packet retransmission number as an evaluation value, and compares the evaluation value with an evaluation threshold or with a previously stored evaluation value so as to configure the first channels to be the good channels in the channel map.

16. The communication device of claim 12, wherein when the control circuit performs signal transmission tests and the number of the consecutive bad channels is less than the bandwidth threshold, the transceiving circuit transceives the frequency hopping signals with one or more third channels chosen from the bad channels in company with at least part of the good channels.

17. The communication device of claim 12, further comprises:
a timer circuit, for recording a timespan of one or more communication intervals in which the transceiving circuit transceives the frequency hopping signals;
wherein the control circuit compares the timespan with a time threshold so as to configure the transceiving circuit to transceive the frequency hopping signals according to at least part of the good channels in company with at least part of the bad channels.

18. The communication device of claim 17, wherein the control circuit uses at least one of a signal to noise ratio, a packet error rate, a packet error number, an error rate of the frame check sequence, an error number of a frame check sequence, an error rate of a header check sequence, an error number of the header check sequence, and a packet retransmission number as an evaluation value, and compares at least one of the evaluation value with an evaluation threshold or with a previously stored evaluation value so as to configure the first channels to be the good channels in the channel map.

19. A method for performing frequency hopping communications in a plurality of channels of a frequency band, comprising:
transceiving frequency hopping signals by utilizing a transceiving circuit with at least part of a plurality of good channels in a channel map;
recording a timespan of one or more communication intervals for transceiving the frequency hopping signals; and
comparing the timespan with a time threshold by utilizing a control circuit to determine whether signal transmission tests should be performed to update the channel map;
wherein the channel map records the locations of the good channels in the frequency band; and the transceiving circuit transceives the frequency hopping signals with at least part of the good channels and at least part of the bad channels when the control circuit performs the signal transmission tests.

20. The method of claim 19, further comprising:
transceiving the frequency hopping signals with one or more first channels chosen from consecutive bad channels in company with at least part of the good channels when the control circuit performs signal transmission tests and a number of the consecutive bad channels is greater than a bandwidth threshold;
wherein the first channels are not neighboring to the good channels in the channel map.

* * * * *